(12) United States Patent
Saito et al.

(10) Patent No.: US 6,908,576 B2
(45) Date of Patent: Jun. 21, 2005

(54) METHOD OF MANUFACTURING PLASTIC OPTICAL FIBER

(75) Inventors: Katashi Saito, Kitakanbara-gun (JP); Osamu Shinji, Kitakanbara-gun (JP)

(73) Assignee: Kuraray Co., Ltd., Kurashiki (JP)

( * ) Notice: Subject to any disclaimer, the term of this patent is extended or adjusted under 35 U.S.C. 154(b) by 437 days.

(21) Appl. No.: 09/972,862

(22) Filed: Oct. 10, 2001

(65) Prior Publication Data

US 2002/0041044 A1 Apr. 11, 2002

(30) Foreign Application Priority Data

Oct. 11, 2000 (JP) .................................... 2000-310110

(51) Int. Cl.[7] .................................................. B29D 11/00
(52) U.S. Cl. ..................... 264/1.27; 264/1.36; 264/492
(58) Field of Search ............................ 264/1.24, 1.27, 264/1.36, 2.7, 492; 427/163.2

(56) References Cited

U.S. PATENT DOCUMENTS

| | | | | |
|---|---|---|---|---|
| 4,154,634 A | * | 5/1979 | Shobert et al. ............. 156/180 |
| 4,571,313 A | * | 2/1986 | Allemand et al. ......... 264/1.29 |
| 4,708,833 A | * | 11/1987 | Ohsawa et al. ............ 264/1.24 |
| 4,822,998 A | * | 4/1989 | Yokota et al. .............. 250/226 |
| 4,837,478 A | * | 6/1989 | Anzai et al. ................. 313/112 |
| 5,606,638 A | * | 2/1997 | Tymianski et al. .......... 385/143 |
| 5,827,611 A | | 10/1998 | Forbes |
| 6,187,616 B1 | * | 2/2001 | Gyoda ........................ 438/160 |
| 6,275,750 B1 | * | 8/2001 | Uchida et al. .............. 700/300 |
| 2004/0076756 A1 | * | 4/2004 | Fey et al. ................ 427/372.2 |

OTHER PUBLICATIONS

Patent Abstracts of Japan, JP 63-287910, Nov. 25, 1988.
Patent Abstracts of Japan, JP 63-287907, Nov. 25, 1988.
X. Llop, et al., Journal of Physics D: Applied Physics, vol. 27, No. 1, XP-000424381, pps. 25–28, "Molecular Orientation in Plastic Optical Fibres", Jan. 14, 1994.

* cited by examiner

Primary Examiner—Chris Fiorilla
Assistant Examiner—Yewebdar Tadesse
(74) Attorney, Agent, or Firm—Oblon, Spivak, McClelland, Maier & Neustadt, P.C.

(57) ABSTRACT

In a method of manufacturing a plastic optical fiber by heating and drawing either one end portion of a transparent plastic rod, a plastic optical fiber having a cross sectional form approximately similar to the cross sectional form of the transparent plastic rod, the transparent plastic rod is heated by exposing near infrared ray which is radiated from a near infrared ray source. This can prevent the plastic optical fiber from causing to blow many bubbles on the surface and heat degradation to allow the plastic optical fiber to be obtained with a high quality.

13 Claims, 5 Drawing Sheets

METHOD OF MANUFACTURING PLASTIC OPTICAL FIBER

BACKGROUND OF THE INVENTION

1. Field of the Invention

The present invention relates to a method of manufacturing a plastic optical fiber, particularly to a method of manufacturing a plastic optical fiber containing a fluorescent dye.

2. Description of the Related Art

In most of ordinary methods of manufacturing optical fibers, a melt extrusion spinning method is employed in which transparent plastic is molten to be extruded from a narrow nozzle. In an example of the method of manufacturing a plastic optical fiber employing the melt extrusion spinning method, methylmethacrylate monomer is subjected to bulk polymerization, for example, for being continuously extruded as a fiber without passing through a process of being formed in pellets. Although an extruding machine used for the melt extrusion spinning method is an apparatus being large sized and expensive, the melt extrusion spinning method is suited for mass production. However, in the method, the extruding machine takes so a long time from a start of an operation to a steady operation that the method causes large losses in time and material. Therefore, an attempt of changing material such as a change in kind of resin as a material or a change in kind of additive causes losses due to the change to make the melt extrusion spinning method not always suitable for small-lot production of a wide variety of products.

In another method of manufacturing a plastic optical fiber, a rod of transparent plastic is molded before the one end thereof being heated to be drawn to a thin monofilament (hereinafter the method is referred to as the "drawing method"). Although the drawing method is not suited for mass production, it facilitates manufacturing of various kinds of optical fibers having cross sectional forms of not only being circular but also being irregularly shaped such as being rectangular. The method also facilitates change in material to be suitable for production of wide variety of products. The method of manufacturing a plastic optical fiber employing the drawing method is often applied to manufacturing a plastic optical fiber for a special purpose application such as a fluorescent fiber, or a scintillating fiber. In the drawing method, either one end portion of a transparent plastic rod is generally heated at temperatures on the order of 200 to 350° C. by a cast heater. With the heating method, the rod is heated by a part of heat from a heater conducted to the surface of the rod via air or inert gas made as a conduction medium. In addition, the surface of the rod is directly heated by far infrared rays radiated from the surface of the heater. When using a heater, a high absorption efficiency of the transparent plastic for the far infrared rays makes only the surface of the rod heated both by the heating with air taken as a heat conduction medium and by the heating with far infrared rays.

In general, plastic material has a small thermal conductivity. When a thick plastic rod is going to be heated by a heater or hot air in the drawing method, this small thermal conductivity causes that the temperature only on the surface is raised and the temperature of the central portion is not raised, thereof the heat can not conduct to the central portion. Thus, the drawing was made impossible. When the temperature of the heater or the hot air is raised for raising the temperature of the rod so far as the central portion, only the temperature of the rod surface is excessively raised to cause blowing or heat deterioration on the rod surface. This will induce defects and nonuniformity in diameter in an optical fiber manufactured from such a rod only to provide the optical fiber as being inferior in light transmission loss.

In a field of vacuum forming of plastic plates, it is known that a near infrared ray source such as a halogen lamp can be used as a heat source. The use of such a heat source, because of low absorption efficiency in plastic for near infrared rays, necessitates a supply of considerably large power to offer a problem in heating efficiency.

SUMMARY OF THE INVENTION

The present invention was made in view of the above problems with an object of providing a drawing method of manufacturing a plastic optical fiber, in which method the plastic optical fiber is produced with a high production speed and with a high quality without blowing bubbles or heat degradation.

The present invention relating to the method of manufacturing a plastic optical fiber for solving the above problems is provided so that, the method of manufacturing a plastic optical fiber comprises:

a step that either one end portion of a transparent plastic rod is heated by exposing near infrared ray which is radiated from a near infrared ray source and;

a step that the end portion is drawn to forming a plastic optical fiber, wherein the plastic optical fiber having a cross sectional form approximately similar to the cross sectional form of the transparent plastic rod.

In the present invention of the method of manufacturing a plastic optical fiber, the near infrared ray source used for heating the transparent plastic rod is preferably a near infrared ray radiating body with color temperature thereof being from 1000 to 4000K for radiating near infrared ray with a wavelength, which is the peak of radiation energy spectrum, being from 0.7 to 3 $\mu$m, because, with such near infrared rays, the rod can be uniformly heated so far as inside thereof yet without decreasing heating efficiency. In addition, it is preferable to provide a short-wavelength cut-off filter between the near infrared ray source and the transparent plastic rod to be heated for cutting off light rays with short wavelengths equal to or less than wavelengths of visible light rays or wavelengths of ultraviolet rays. This is because the rod material can be prevented from being deteriorated due to irradiation of visible light rays and ultraviolet rays.

For the transparent plastic rod, there can be used a rod comprising a bundle of a number of plastic optical fibers. In addition, the transparent plastic rod may contain fluorescent dyes. The shape of the rod is not limited to be cylindrical, but can be molded to be in an irregular shape in section such as a square, a rectangle or a triangle to allow the fiber to be manufactured as being an irregular cross sectional shape optical fiber.

DESCRIPTION OF THE PREFERRED EMBODIMENTS

In the following, an embodiment of the present invention will be explained in detail with reference to the drawings.

Figure 1:
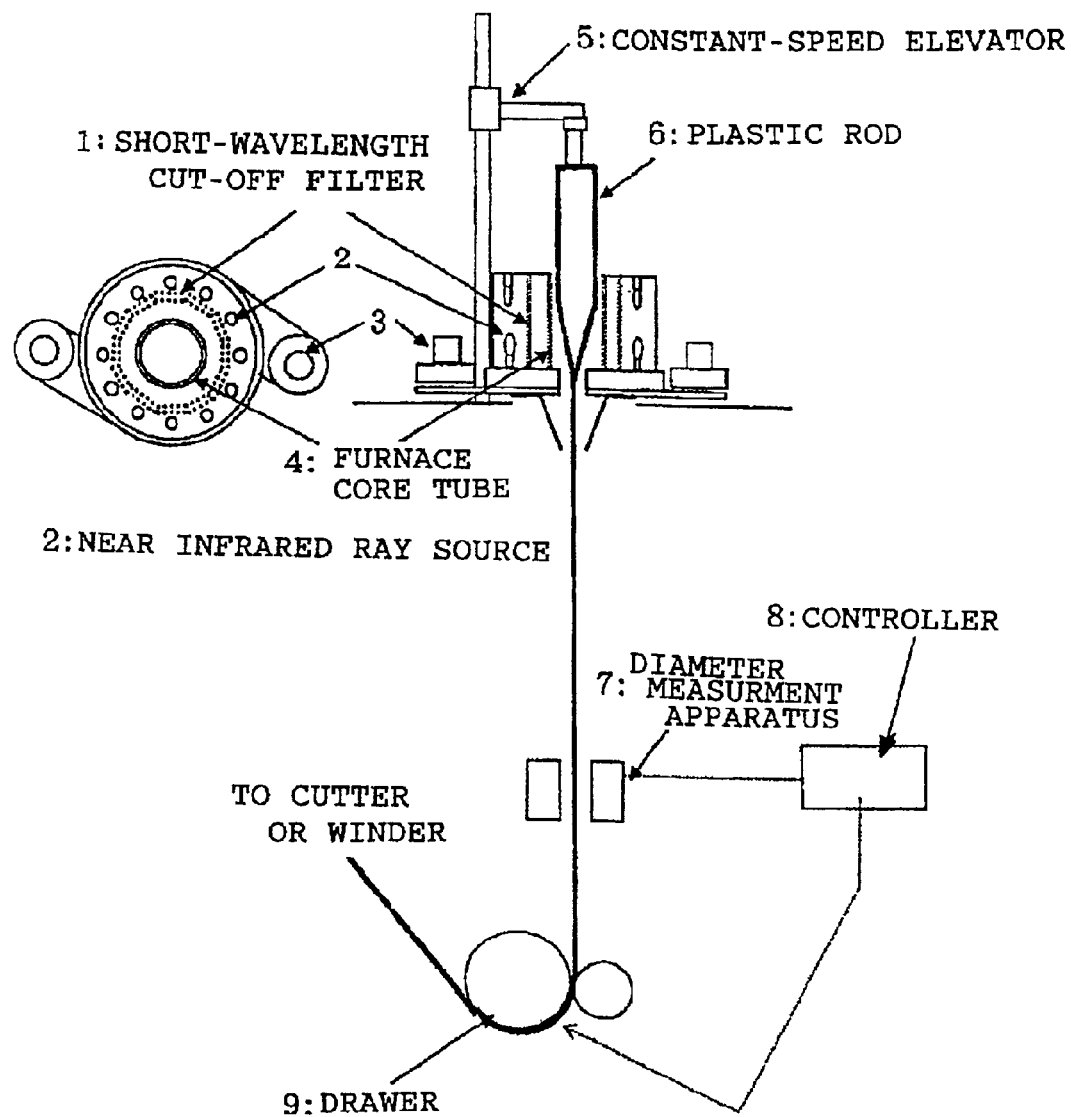
FIG. 1 is a schematic diagram showing an example of a combination of a near infrared ray furnace and an drawing apparatus used in a method according to the present invention.

FIG. 1 shows a near infrared ray furnace and a drawing apparatus used in a method according to the present invention. The near infrared ray furnace is provided with near infrared ray sources 2. Near infrared rays radiated from the near infrared ray sources 2 transmit through a furnace core tube 4, such as a transparent glass tube, to irradiate a transparent plastic rod 6. The near infrared ray sources 2 are arranged at uniform intervals around the furnace core tube 4 surrounding the transparent plastic rod 6. Unless the near infrared ray sources 2 are arranged at uniform intervals, even though the transparent plastic rod 6 is formed round in cross section, a plastic optical fiber will be sometimes formed in an ellipse or in an irregular shape in cross section. In order to obtain the plastic optical fiber with the cross section formed round, a number of (eight or more, preferably ten or more) infrared ray sources 2 are well arranged. The infrared ray sources 2 may be provided in a vertical multistage arrangement with two or more stages. In this way, near infrared rays radiated from a plurality of near infrared ray sources 2 are concentrated to the transparent plastic rod. Therefore, in the method according to the present invention, in spite of a low absorption efficiency of plastic for near infrared rays, the transparent plastic rod can be heated with low supplied power.

Figure 2:
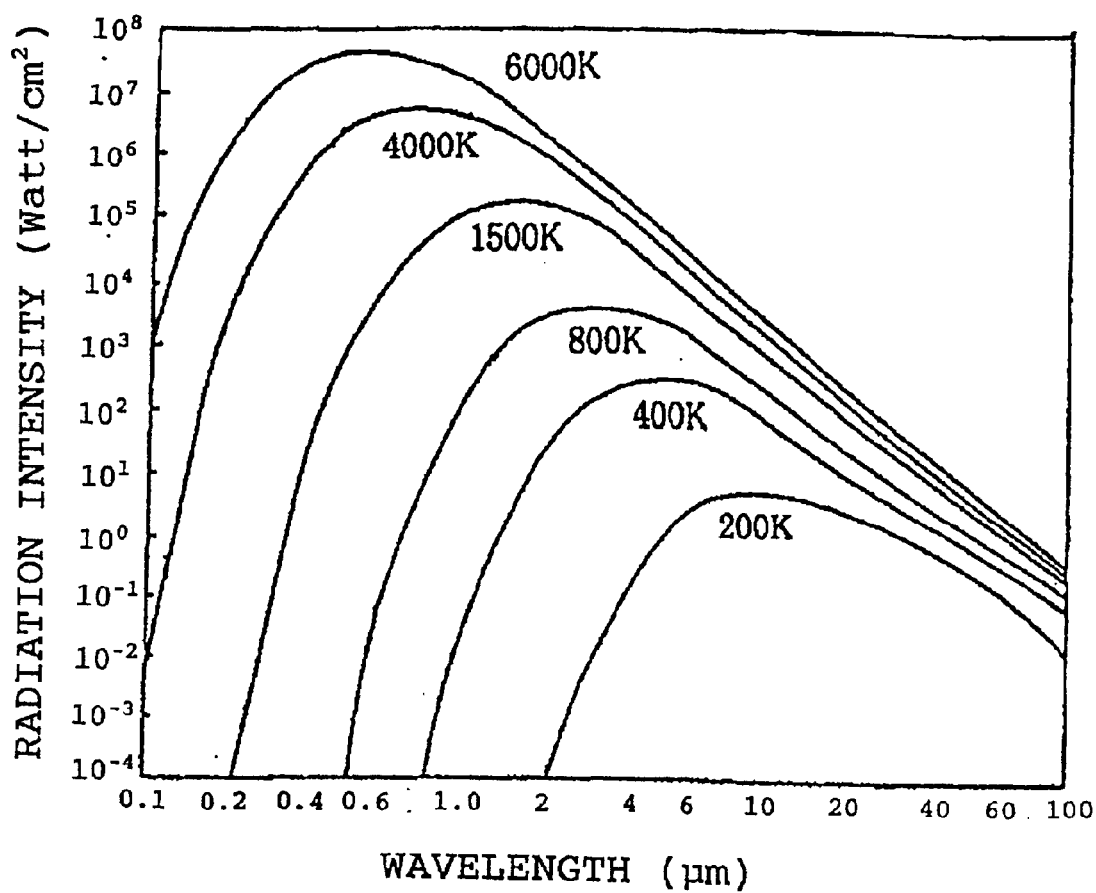
FIG. 2 is a diagram showing spectral distributions of radiation intensities of a halogen lamp.

As the near infrared ray sources 2, there is used radiant heat transfer sources with heat radiation thereof being like black-body radiation according to Planck's law of radiation. An incandescent lamp or a halogen lamp for illumination having a tungsten filament as a radiation source is suitably used as a radiant heat transfer source. FIG. 2 is a diagram showing temperatures of radiation sources (color temperatures) and spectral distributions of radiation intensities of a halogen lamp as a source of black-body radiation according to Planck's law of radiation. A relation between the wavelength λmax for the maximum radiant energy and an absolute temperature T, and a relation between a total radiant energy E and an absolute temperature T are shown by the following expressions (1) and (2), respectively. The expression (2) is known as the Stefan-Boltzmann's law.

$$\lambda\text{max} \cdot T = 2884 \ (\mu\text{m} \cdot K) \quad (1)$$

$$E = \sigma T^4 \ (\sigma\text{:constant}) \quad (2)$$

Figure 3:
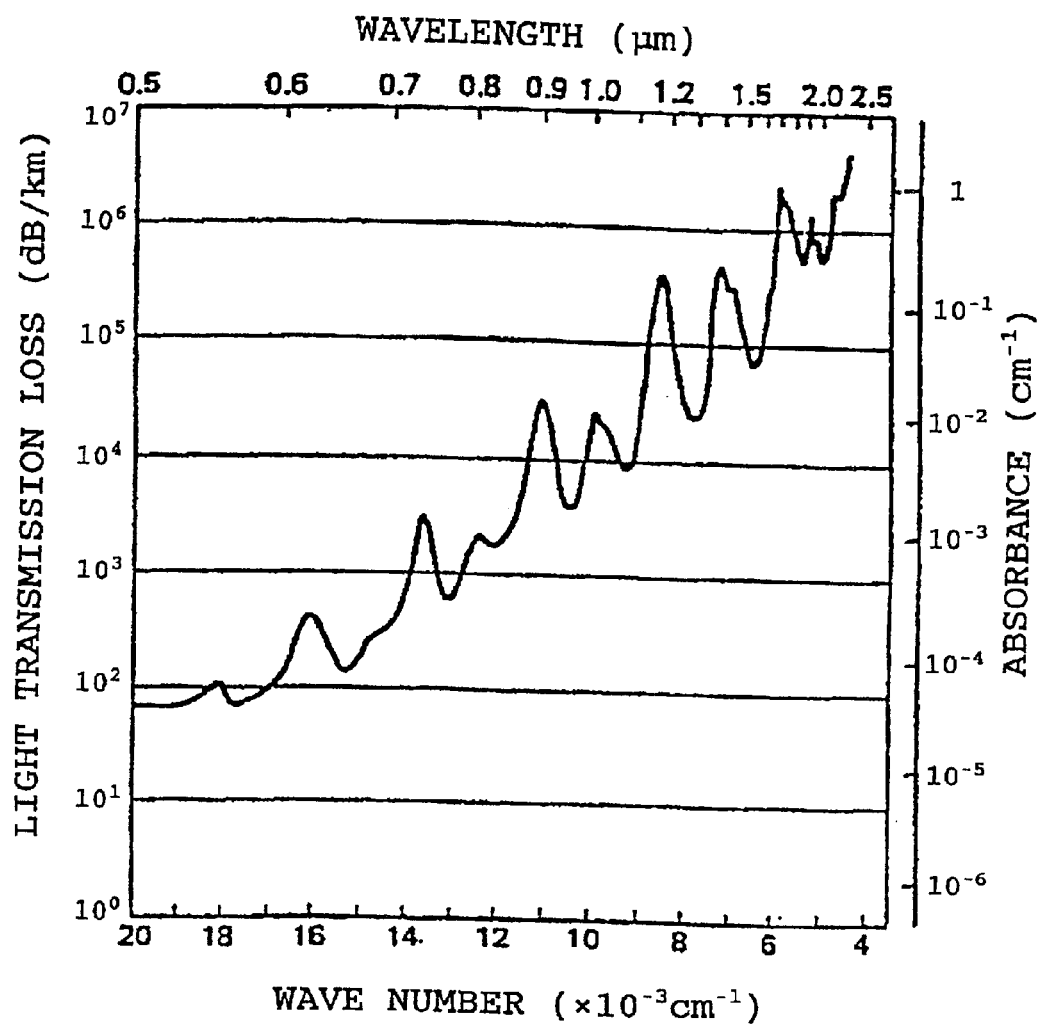
FIG. 3 is a diagram showing absorbance of acrylic (polymethylmethacrylate) resin.

FIG. 2, the expressions (1) and (2) show that as temperatures become higher, the wavelength at the peak of the spectral distribution of the radiation energy becomes shorter with an additional rapid increase in radiation energy. For example, when the color temperature of the halogen lamp is 3000K, from FIG. 2 and the expression (1), it becomes apparent that the peak of the radiant energy of the halogen lamp is at a wavelength of about 1 μm. Here, with respect to acrylic resin as a material of the transparent rod, an absorbance thereof is shown in FIG. 3 (Toshikuni KAINO et al., Review of the Electrical Communication Laboratories, Vol. 32, No. 3, p478–488 (1984)). It becomes apparent from FIG. 3 that acrylic resin (polymethylmethacrylate) is transparent for rays with wavelengths 0.7 μm or less with little absorption, the absorption gradually increases from the visible light ray with the wavelength of 0.7 μm to the ray with the wavelength of 3 μm, and for far infrared rays with wavelengths over 3 μm, absorbance per 1 cm becomes 10 or more (namely, 99% absorption for 1 cm transmission) to make the acrylic resin almost opaque. That is, in order to heat inside of the acrylic resin so far as the depth from several centimeters to ten centimeters, it is preferable to heat the acrylic resin with near infrared rays with wavelengths at around 1 μm. To such near infrared rays, the acrylic resin is semitransparent such that the near infrared rays are absorbed on the order of a half. Compared with this, heating by far infrared rays with the wavelengths, which are the peaks of the radiation energy spectra, at over 3 μm is liable to cause blowing bubbles on the surface and heat degradation. This is due to heat generated by the far infrared rays almost absorbed on the surface of the acrylic resin having large absorbance to the far infrared rays. While, heating by visible light rays with the wavelengths, which are the peaks of the radiation energy spectra, at less than 0.7 μm permits the acrylic resin to transmit the visible rays due to small absorbance thereof. This causes not only no heating of the transparent acrylic resin but also highly possible optical damage of the heated acrylic resin.

Although the absorbance was shown about the polymethylmethacrylate resin in FIG. 3, common transparent plastic such as polystyrene resin, polycarbonate resin, or PET resin also has similar characteristic of absorbing rays in a wavelength region of infrared rays, so that they can be suitably applied to the present invention. The present invention, in which the transparent plastic rod is heated by using near infrared rays, allows the rod to be heated from inside. This prevents the surface temperature of the transparent plastic rod is prevented from being raised more than necessary as was experienced in a common case of using a heating source of conductive heat transfer such as a cast heater. Thus, it is possible to inhibit occurrences of blowing bubbles and heat degradation. Moreover, an internal heating with the near infrared rays can heat the inside of the rod within a time shorter than the time spent when the heating source of conductive heat transfer is used. Therefore, it becomes possible to increase a drawing speed of the plastic optical fiber more than the speed in an ordinary method and to draw a transparent plastic rod having a diameter larger than that of a rod drawn by an ordinary method.

The near infrared ray sources 2 used for heating the transparent plastic rod may be any kind of heating sources of black-body radiators with color temperatures thereof being from 1000 to 4000K for radiating infrared ray with the wavelength, which is the peak of radiation energy spectrum, being from 0.7 to 3 μm. The heating source is more preferable with the wavelength, which is the peak of radiation energy spectrum, being from 0.8 to 2 μm (color temperatures of 1500 to 3500K). For example, a halogen lamp, a tungsten lamp, a metal halide lamp, and near infrared laser, each having a high radiation efficiency, can be used as being suitable.

Figure 4A:
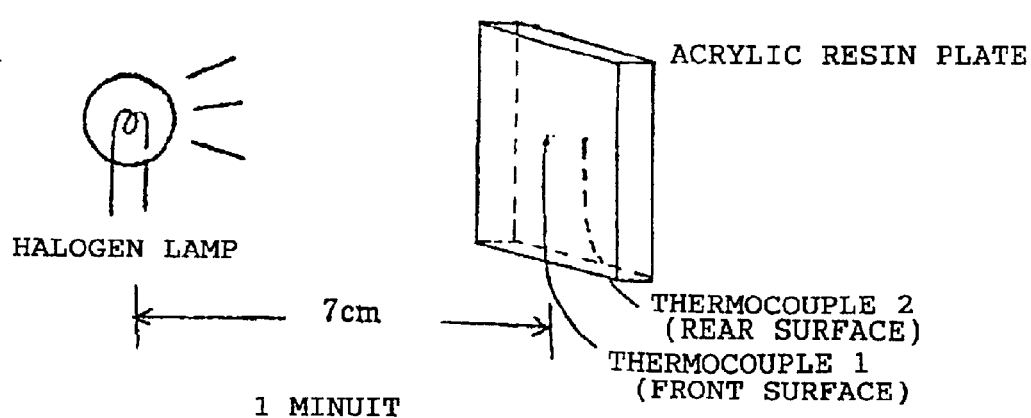
FIG. 4A is a schematic view showing a method of a heating test using near infrared rays.
Figure 4B:
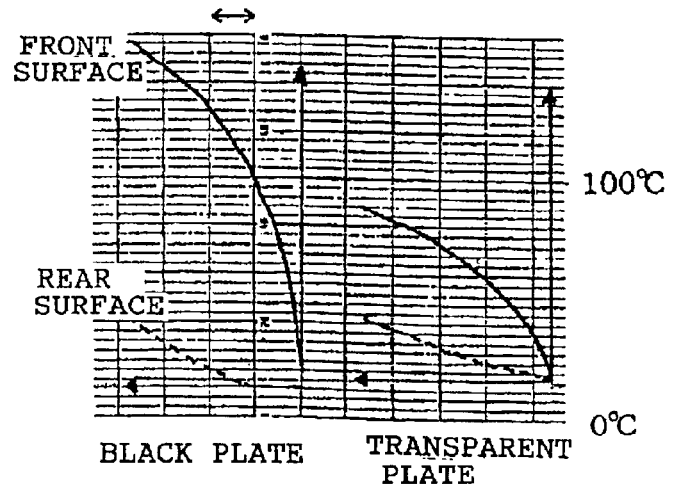
FIG. 4B is a diagram showing results of the heating test shown in FIG. 4A.

FIG. 4A is a schematic view showing an arrangement of a test for ascertaining that the inside of a transparent plastic body is effectively heated by using near infrared rays. Here, acrylic resin plates (two kinds of transparent and black colored) each having a length of 70 mm, a width of 90 mm, and a thickness of 10 mm were prepared with a thermocouple mounted on the central portion of each of front and rear surfaces of each of the acrylic resin plates. At a position 7 cm away from the acrylic resin plate, a halogen lamp (100V 500W, 2950K of color temperature) was provided from which near infrared rays were emitted for irradiating the acrylic plate while temperature change thereof being measured (the results of the measurement are shown in FIG. 4B). The results shown in FIG. 4B shows that temperatures of the transparent acrylic plate are 80° C. on the front surface and 28° C. on the rear surface at three minutes after the start of heating. Thus, the temperature difference between the front and rear surfaces is as small as 52° C., though heating efficiency is not so high. This shows that heating of the inside of the transparent acrylic resin plate proceeds well. Against this, the results of the test with the black acrylic resin plate, carried out for simulating conductive heat transfer and heating with far infrared rays, are also shown in FIG. 4B for comparison. In the black acrylic plate, the temperature on the front surface is 143° C. and the temperature on the rear surface is 26° C. at three minutes after the start of heating. Thus, the temperature difference between front and rear surfaces is as large as 117° C. This shows that, though heating efficiency is high, heating of only the front surface proceeds excessively. In addition, in the black acrylic plate, no temperature rise is observed on the rear surface until about one minute after the start of irradiation. Compared with this, in the transparent acrylic resin, temperature rise on the rear surface begins simultaneously with the start of irradiation. This also shows that the inside is directly heated by the radiation of the near infrared rays rather than by heat conduction.

Figure 5:
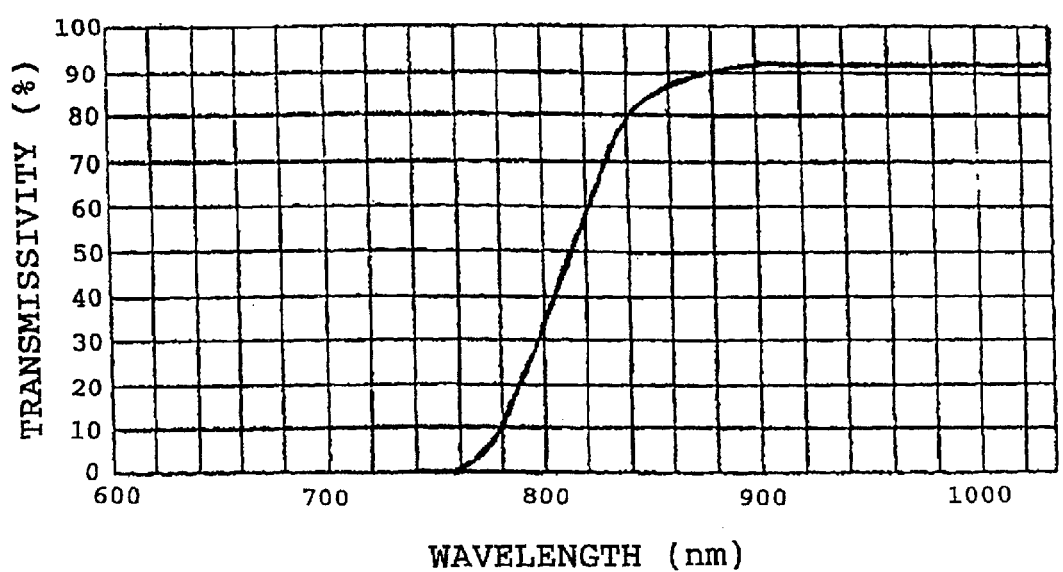
FIG. 5 is a diagram showing an example of a wavelength cut-off characteristic of a short-wavelength cut-off filter suitable for being used in combination with a halogen lamp.

A halogen lamp also emits visible rays and ultraviolet rays detrimental to the transparent plastic. Therefore, a short wavelength cut-off filter 1, cutting rays with shorter wavelengths equal to or less than 700 to 800 nm, is well provided between the halogen lamp and the transparent plastic rod to be heated for eliminating visible rays and ultraviolet rays unnecessary for heating the transparent plastic rod (see FIG. 1). An example of characteristics of a short-wavelength cut-off filter suited for being used in combination with a halogen lamp is shown in FIG. 5. Here, the cut-off wavelength of a short-wavelength cut-off filter is defined as a wavelength at which transmissivity of transmitting light becomes 50%. It is preferable for the short-wavelength cut-off filter to cut off ultraviolet rays with wavelengths equal to or less than 400 nm, and more preferably, to cut off ultraviolet rays including visible light rays with wavelengths equal to or less than 700 nm or 800 nm. When a plastic scintillating fiber is manufactured according to the method of the present invention, it is particularly preferable to provide the short-wavelength cut-off filter. This is because ultraviolet ray irradiation sometimes causes color degradation of fluorescent dyes contained in the plastic, or coloring the transparent plastic. Selection of a cut-off wavelength is a matter to be adequately decided by considering balance between light-resistance and heating efficiency of fluorescent agent and resin to be used.

In the near infrared ray furnace and the drawing apparatus used in the method according to the present invention as shown in FIG. 1, cooling fans 3 are mounted on the near infrared furnace so as to protect electric wires and the short-wavelength cut-off filter in the furnace, and so as not to excessively raise the temperatures of peripheral members including the transparent grass tube 4 as the furnace core tube for the purpose of enhancing the effect of the near infrared ray heating. The transparent glass tube 4 can prevent the transparent plastic rod 6 from being directly blown by cooling air from the cooling fan 3 and from causing variation in diameter of the drawn rod 6.

The transparent plastic rod 6 is moved down at a constant speed by constant-speed elevator 5. Under the near infrared ray furnace, a puller 9 is provided, through which a transparent fiber drawn to have a cross sectional form approximately similar to the cross sectional form of the transparent plastic rod 6 is fed to a cutter or a winder. The outside diameter of the transparent fiber is measured by an outside diameter measurement apparatus 7. Along with this, the result is compared with a specified value of the outside diameter (a target value). In compliance with the difference from the specified value of the outside diameter, a drawing speed of the drawer 9 is controlled.

In manufacturing a plastic optical fiber by the method according to the present invention, as the transparent plastic rod to be used, there are named those, each with a combination of core material/cladding material comprising, for example, polystyrene/acrylic resin, acrylic resin/fluorinated resin, or polycarbonate/acrylic resin. In addition, the transparent plastic rod may comprise a bundle of a number of plastic optical fibers, from which rod a fluorescent fiber or a scintillating fiber can be also suitably manufactured with a fluorescent dye being added into the transparent plastic rod. The fluorescent dye preferably used for the scintillating fiber is normally a mixture of two kinds of dye. For a first dye, PTP (para-terphenyl), or b-PBD (2-<4-1-butylphenyl>-5-<4-biphenylyl>-1,3,4-oxadiazole) is used, and for a second dye, there is used BDB (4,4'-bis-<2,5-dimethylstyryl>-diphenyl), Bis-MSB (1,4-bis<2-methylstyryl>benzene), or 3HF (3-hydroxyflavone).

EXAMPLE 1

In the near infrared ray furnace and the drawing apparatus shown in FIG. 1, the near infrared ray sources 2 were provided as two stages of twelve (twenty four in total) halogen lamps (color temperature of 2750K for supply voltage of 100V, lamp supply voltage of 75V, and current of 19.5A) arranged at uniform intervals on a circle with a radius of 120 mm. Inside such an arrangement of halogen lamps, there is mounted an infrared ray transmitting filter (ITF-50S-80IR, manufactured by Sigma Koki Co., Ltd.) with the transmission characteristic shown in FIG. 5. In the apparatus, a rod for a plastic optical fiber with a diameter of 70 mm was set which comprises polystyrene resin (core material) and acrylic resin (cladding material). The top end of thus set rod was introduced into the halogen lamp near infrared ray furnace with a moving down speed of 1.65 mm/min for being heated. The resin, heated, softened and hung down from the rod, was introduced to the drawer (drawing speed of 7.2 m/min) through the outside diameter gauge detector unit 7, by which the resin can be drawn into a plastic optical fiber having 1 mm diameter without blowing bubbles. In the plastic optical fiber, a transmission loss was superior as being 195 dB/km at the wavelength of 670 nm.

EXAMPLE 2

In the apparatus used for the example 1, a 70 mm diameter rod for a plastic scintillating fiber was introduced which rod comprises polystyrene resin containing fluorescent dyes for a plastic scintillator (core material) and acrylic resin (cladding material). The rod was heated and drawn under a heating condition and with a moving down speed both the same as those for the rod in the example 1. This allowed a 1 mm diameter plastic scintillating fiber to be manufactured without producing any blowing bubbles. Fluorescent dyes contained in the polystyrene resin are 1% of 2-(4- tbutylphenyl)-5-(4-biphenyl)1,3,4 oxadiazole, and 0.02% of 4-4'bis(2,5 dimethyl styryl)diphenyl. In the example 2, a drawing speed at the drawer 9 was 7.5 m/min. The plastic scintillating fiber provided a satisfactory light yield characteristics without any problem with an attenuation length as an index of transparency being superior as 380 cm.

EXAMPLE 3

In the apparatus used for the example 1, a 100 mm diameter rod for a plastic optical fiber was introduced which rod comprises polystyrene resin (core material) and polymethylmethacrylate resin (cladding material). The rod was heated and drawn to allow a 1 mm diameter plastic optical fiber to be manufactured without producing any blowing. In the example 3, the halogen lamp was operated by a supply voltage of 85V with a current of 22.5A. The moving down speed of the rod was 2.0 mm/min, and the drawing speed at the drawer 9 was 19.5 m/min. The measured transmission loss of the plastic optical fiber was 185 dB/km at the wavelength of 670 nm.

COMPARISON EXAMPLE 1

A drawing apparatus with a structure similar to that shown in FIG. 1 was used in which, as a heating source, a brass cast heater with 150 mm diameter (heater temperature at 320° C.) was incorporated as a substitute for the halogen lamp. Like in the example 1, a 70 mm diameter rod for a plastic optical fiber was introduced in the drawing apparatus which rod comprises polystyrene resin (core material) and polymetylmethacrylate resin (cladding material). The rod was heated and drawn in an attempt to manufacture a 1 mm diameter plastic optical fiber. At this time, the moving down speed of the rod was 1.1 mm/min, and the drawing speed at the drawer 9 was 4.8 m/min. Next, for the purpose of increasing the drawing speed, the moving down speed of the rod was changed to 1.65 mm/min (the same drawing speed as that in the example 1). This, however, resulted in an insufficient heating of the inside of the rod to make drawing impossible. Hence, the temperature of the brass cast heater was increased up to 340° C. This, however, caused to blow many bubbles on the heated surface of the rod to make it impossible to obtain a well manufactured optical fiber with little nonuniformity and without any defect. The light transmission loss of the plastic optical fiber was measured as being so low as to be 450 dB/km.

COMPARISON EXAMPLE 2

In the apparatus used for the comparison example 1, a rod for an optical fiber with a thick diameter of 100 mm, the same as that of the rod in the example 3, was introduced to be heated and drawn in an attempt to manufacture a plastic optical fiber. Although the temperature of the brass cast heater was set at 340° C. and the moving down speed of the rod was taken at 0.5 mm/min, the inside of the rod was insufficiently heated to make drawing impossible. Hence, the temperature of the heater was increased up to 360° C. This, however, caused to blow many bubbles on the surface of the rod to make it impossible to obtain a well-manufactured optical fiber with little nonuniformity in diameter and without any defect.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. The method of manufacturing a plastic optical fiber comprises:
   heating an end portion of a transparent plastic rod with a near infrared ray radiated from a near infrared ray source; and
   drawing said end portion to form a plastic optical fiber, wherein the plastic optical fiber has a cross sectional form approximately similar to the cross sectional form of the transparent plastic rod, wherein a short-wavelength cut-off filter is provided between the near infrared ray source and the transparent plastic rod, said filter being configured to cut off visible light rays with wavelengths equal to or less than 800 nm.

2. The method of manufacturing a plastic optical fiber as claimed in claim 1, wherein the near infrared ray source radiates at a temperature ranging from 1000 to 4000 K and a radiation intensity from said source peaks at wavelengths ranging from 0.7 to 3 μm.

3. The method of manufacturing a plastic optical fiber as claimed in claim 1, wherein the transparent plastic rod contains a fluorescent dye.

4. The method of manufacturing a plastic optical fiber as claimed in claim 1, wherein the transparent plastic rod comprises a bundle of a number of plastic optical fibers.

5. The method of manufacturing of claim 1, wherein the near infrared source is a plurality of near infrared ray sources arranged at uniform intervals around the transparent plastic rod, and the short wavelength cut-off filter is provided between the plurality of near infrared sources and the transparent plastic rod.

6. The method of manufacturing of claim 5, wherein said plurality comprises eight or more near infrared ray sources.

7. The method of manufacturing of claim 5, wherein said plurality comprises ten or more near infrared ray sources.

8. The method of manufacturing of claim 5, wherein said plurality of near infrared ray sources are arranged in two or more vertical stages.

9. The method of manufacturing of claim 1, wherein said near infrared ray source comprise at least one of a halogen lamp, a tungsten lamp, a metal halide lamp, or a near infrared laser.

10. The method of manufacturing of claim 1, wherein said filter is configured to cut off wavelengths of ultraviolet rays with wavelength equal to or less than 400 nm.

11. The method of manufacturing of claim 10, wherein said plastic optical fiber is a scintillating fiber.

12. The method of manufacturing of claim 1, wherein a transparent glass tube is provided between the transparent plastic rod and the near infrared ray source.

13. The method of manufacturing of claim 1, wherein the near infrared ray source radiates at a temperature ranging from 1500 to 3500 K and a radiation intensity from said source peaks at wavelengths ranging from 0.8 to 2 μm.

* * * * *